(12) United States Patent
Baba

(10) Patent No.: US 6,901,250 B2
(45) Date of Patent: May 31, 2005

(54) MOUNTING STRUCTURE OF ANTENNA SWITCHING CIRCUIT IN WHICH RECEPTION INTERFERENCE IS SUPPRESSED

(75) Inventor: Toshiki Baba, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 458 days.

(21) Appl. No.: 10/235,774

(22) Filed: Sep. 5, 2002

(65) Prior Publication Data

US 2003/0058185 A1 Mar. 27, 2003

(30) Foreign Application Priority Data

Sep. 6, 2001 (JP) ........................................ 2001-270478

(51) Int. Cl.$^7$ .............................................. H04B 1/00
(52) U.S. Cl. ........................................ 455/333; 455/78
(58) Field of Search ................................. 455/333, 78

(56) References Cited

U.S. PATENT DOCUMENTS 5,903,820 A * 5/1999 Hagstrom .................... 455/82
6,697,605 B1 * 2/2004 Atokawa et al. ............... 455/82
6,795,714 B1 * 9/2004 Fickenscher et al. ..... 455/552.1

FOREIGN PATENT DOCUMENTS

| JP | H06-197040 | 7/1994 |
| JP | H08-307101 | 11/1996 |

* cited by examiner

Primary Examiner—Nick Corsaro
Assistant Examiner—Michael Chu
(74) Attorney, Agent, or Firm—Brinks Hofer Gilson & Lione

(57) ABSTRACT

In a mounting structure of an antenna switching circuit, a first switching diode is connected between a first conductor pattern and a second conductor pattern, an inductor is connected between the first conductor pattern and a third conductor pattern, a first capacitor is connected between the third conductor pattern and a fourth conductor pattern, and a second switching diode is implemented by a bare chip. The bare chip is mounted on the fourth conductor pattern, a cathode thereof being connected to the fourth conductor pattern and an anode thereof being connected to the third conductor pattern via a bonding wire.

3 Claims, 4 Drawing Sheets

MOUNTING STRUCTURE OF ANTENNA SWITCHING CIRCUIT IN WHICH RECEPTION INTERFERENCE IS SUPPRESSED

BACKGROUND OF THE INVENTION

1. Field of the Invention

The present invention relates to a mounting structure of an antenna switching circuit of a transceiver.

2. Description of the Related Art

An antenna switching circuit of a transceiver typically includes a first switching diode 33 connected between an input/output terminal 31 connected to an antenna not shown and an output terminal of a transmission circuit 32, a π low-pass filter 35 provided between the input/output terminal 31 and an input terminal of a reception circuit 34, and a second switching diode 36 connected between the input terminal of the reception circuit 34 and a ground, as shown in FIG. 6. The low-pass filter 35 is formed of a first capacitor 35a connected between the input terminal of the reception circuit 34 and the ground, an inductor 35b interposed between the input terminal of the reception circuit 34 and the input/output terminal 31, and a second capacitor 35c connected between the input/output terminal 31 and the ground. A cathode of the first switching diode 33 is connected to an anode of the second switching diode 36 for DC voltage via the inductor 35b.

In the construction described above, the switching diodes 33 and 36 are turned on in a transmission mode, whereby the ends of the first capacitor 35a are short-circuited with each other by the second switching diode 36 and the input terminal of the reception circuit 34 is shunted to the ground. Accordingly, the inductor 35b and the second capacitor 35c form a parallel resonance circuit having a resonant frequency substantially equal to the frequency of a transmission signal output from the transmission circuit 32. The transmission signal is output to the input/output terminal 31 via the first switching diode 33. At this time, the input terminal of the reception circuit 34 is shunted to the ground, so that the transmission signal is not input to the reception circuit 34.

On the other hand, the switching diodes 33 and 36 are turned off in a reception mode, whereby a reception signal input to the input/output terminal 31 is input to the reception circuit 34 via the low-pass filter 35. Since the first switching circuit 33 is turned off, the reception signal is not input to the transmission circuit 32.

FIG. 7 shows a known mounting structure of the antenna switching circuit constructed as described above. The reception circuit 34 and the transmission circuit 32 described above are provided on an insulating substrate 41. On the insulating substrate 41, an island-like first conductor pattern 41a that serves as the input/output terminal 31, an island-like second conductor pattern 41b connected to the output terminal of the transmission circuit 32, an island-like third conductor pattern 41c connected to the input terminal of the reception circuit 34, and a fourth conductor pattern 41d, disposed in proximity to and opposing the first conductor pattern 41a and the third conductor pattern 41c, connected to a metallic case (not shown) that is grounded, are provided. These conductor patterns are formed, for example, by etching a copper foil deposited on the insulating substrate 41.

Furthermore, the first switching diode 33 is connected between the first conductor pattern 41a and the second conductor pattern 41b, the inductor 35b is connected between the first conductor pattern 41a and the third conductor pattern 41c, the first capacitor 35a and the second switching diode 36 are connected between the third conductor pattern 41c and the fourth conductor pattern 41d, and the second capacitor 35c is connected between the first conductor pattern 41a and the fourth conductor pattern 41d.

The first and second capacitors 35a and 35c and the inductor 35b are each implemented in the form of what is called a chip component having electrodes for connection on either end thereof. The first and second switching diodes 33 and 36 are each implemented by a resin mold component having connection terminals projecting on either end. Electrodes of the capacitors 35a and 35c and the inductor 35b and terminals of the switching diodes 33 and 36 are connected to the conductor patterns 41a to 41d as shown in FIG. 7, forming the mounting structure of the antenna switching circuit.

In the construction described above, the second switching diode 36 is turned off in a reception mode, forming an equivalent circuit shown in FIG. 8. In FIG. 8, Cj denotes an equivalent capacitance of the PN junction, Lw denotes an equivalent inductance of a bonding wire connecting a P layer or an N layer to a connection terminal, and Ll denotes an equivalent inductance of the connection terminal. The equivalent inductance Ll of the connection terminal is considerably larger than the equivalent inductance Lw of the bonding wire. Cs denotes an equivalent internal stray capacitance, which is connected in parallel to a series circuit of the equivalent junction capacitance Cj and the equivalent inductance Lw of the bonding wire.

In the above equivalent circuit, above a cutoff frequency Fc (approximately 900 MHz) of the low-pass filter 35, a series resonance frequency, and a parallel resonance frequency that is higher than the series resonance frequency, appear due to the presence of the stray capacitance Cs. Furthermore, the series and parallel resonance frequencies are shifted lower by the equivalent inductance Ll of the connection terminal and the capacitance of the first capacitor 35a. Thus, the overall transmission characteristics in relation to the low-pass filter 35 and the switching diode 36 when it is off is such that the series resonance frequency Fs is attenuated and the parallel resonance frequency Fp forms a peak, as shown in FIG. 9. The parallel resonance frequency Fp is calculated, using constants of the equivalent circuit of the second switching diode 36 when it is off, as approximately three times the reception frequency, i.e., approximately 2,700 MHz. Thus, the problem of reception interference has existed due to signals in the vicinity of the parallel resonance frequency Fp entering the reception circuit 34.

SUMMARY OF THE INVENTION

Accordingly, it is an object of the present invention to provide a mounting structure of an antenna switching circuit in which internal stray capacitance of a switching diode itself is minimized so that a resonance frequency in transmission characteristics in relation to a combination of a low-pass filter and the switching diode is shifted higher to such an extent as to avoid effect on reception.

To this end, the present invention provides a mounting structure of an antenna switching circuit, wherein an insulating substrate having thereon a transmission circuit, a reception circuit, and an antenna switching circuit is provided; a first conductor pattern connected to an antenna, a second conductor pattern connected to an output terminal of the transmission circuit, a third conductor pattern connected to an input terminal of the reception circuit, and a fourth conductor pattern disposed in proximity to the third conductor pattern and grounded are formed on the insulating substrate; the antenna switching circuit includes a first switching diode connected between the first conductor pattern and the second conductor pattern, a low-pass filter at least including an inductor connected between the first conductor pattern and the third conductor pattern and a capacitor connected between the third conductor pattern and the fourth conductor pattern, and a second switching diode connected between the third conductor pattern and the fourth conductor pattern, which is turned on or off together in association with the first switching diode; wherein the second switching diode is implemented by a bare chip, and the bare chip is mounted on the fourth conductor pattern with a bottom electrode thereof connected to the fourth conductor pattern and a top electrode thereof connected to the third conductor pattern via a bonding wire. Accordingly, stray capacitance of the second switching diode is reduced, so that a resonance frequency due to the stray capacitance becomes higher, whereby reception interference is suppressed. Furthermore, the size of the insulating substrate can be reduced.

The arrangement may be such that the capacitor is formed by the third conductor pattern, a dielectric layer formed as a film on the third conductor pattern, and a conductor layer formed as a film on the dielectric layer, the conductor layer is connected to the fourth conductor pattern, and the bonding wire is disposed above the conductor layer. Accordingly, stray capacitance is further reduced, and the size of the insulating substrate can be reduced.

The dielectric layer and the conductor layer may be formed by thick-film printing or thin-film vapor deposition. Accordingly, inductance of the second capacitor is absent, avoiding unwanted self-resonance.

DESCRIPTION OF THE PREFERRED EMBODIMENTS

Figure 1:
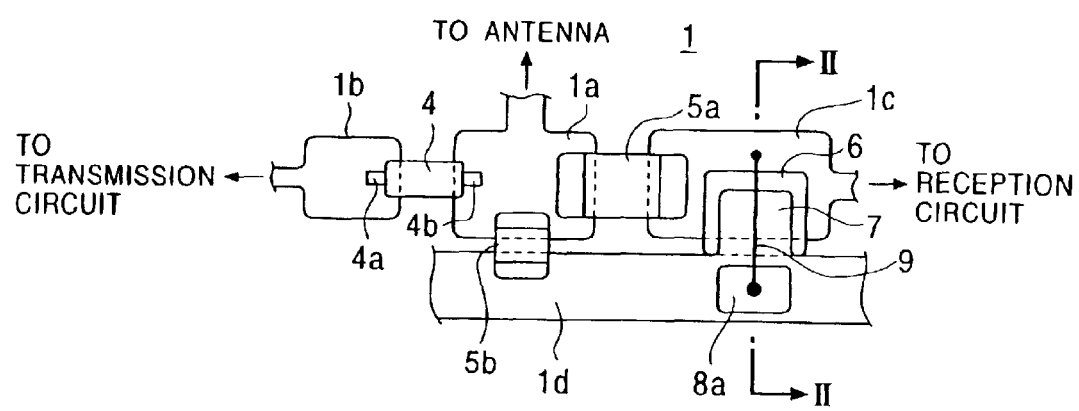
FIG. 1 is a plan view showing a mounting structure of an antenna switching circuit according to an embodiment of the present invention.
Figure 2:
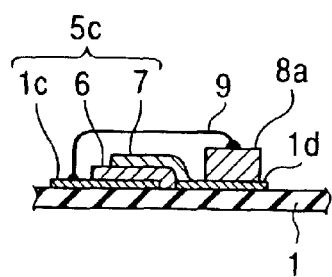
FIG. 2 is a sectional view showing main parts in the mounting structure of the antenna switching circuit according to the embodiment.

FIGS. 1 and 2 show a mounting structure of an antenna switching circuit according to an embodiment of the present invention. FIG. 1 is a plan view and FIG. 2 is a sectional view taken along a line II—II in FIG. 1. Referring to FIGS. 1 and 2, there are formed on an insulating substrate 1 an island-like first conductor pattern 1a connected to an antenna not shown, which serves as an input/output terminal; an island-like second conductor pattern 1b connected to an output terminal of a transmission circuit 2 (FIG. 3); an island-like third conductor pattern 1c connected to an input terminal of a reception circuit 3 (FIG. 3); and a fourth conductor pattern 1d provided in proximity to and opposing the first conductor pattern 1a and the third conductor pattern 1c, connected to a metallic case (not shown) that is grounded. These conductors are formed, for example, by etching a copper foil deposited on the insulating substrate 1.

Furthermore, a first switching diode 4 is provided between the first conductor pattern 1a and the second conductor pattern 1b. The first switching diode 4 has an anode 4a and a cathode 4b for connection, projecting on either end thereof. The anode 4a is connected to the second conductor pattern 1b, and the cathode 4b is connected to the first conductor pattern 1a. Furthermore, an inductor 5a in the form of a chip component is provided between the first conductor pattern 1a and the third conductor pattern 1c, electrodes on either end thereof being connected to the first conductor pattern 1a and to the third conductor pattern 1c, respectively. Furthermore, a second capacitor 5b in the form of a chip component is provided between the first conductor pattern 1a and the fourth conductor pattern 1d, electrodes on either end thereof being connected to the first conductor pattern 1a and to the fourth conductor pattern 1d, respectively.

Furthermore, as shown in FIG. 2, a dielectric layer 6 is formed on the third conductor pattern 1c by thick-film printing or thin-film vapor deposition, and a conductor layer 7 is formed on the dielectric layer 6 by thick-film printing or thin-film vapor deposition. The conductor layer 7 is connected to the fourth conductor pattern 1d. Accordingly, a first capacitor 5c is formed by the third conductor pattern 1c, the dielectric layer 6, and the conductor layer 7.

Furthermore, in a region on the fourth conductor pattern 1d, opposing the third conductor pattern 1c, a bare chip 8a that functions as a second switching diode 8 is mounted, a bottom electrode (cathode) thereof being connected to the fourth conductor pattern 1d and a top electrode (anode) being connected to the third conductor pattern 1c via a bonding wire 9. The bonding wire 9 is provided above the conductor layer 7. Accordingly, stray capacitance between the bonding wire 9 and the third conductor pattern 1c, serving as one of the electrodes constituting the first capacitor 5c, is suppressed.

Figure 3:
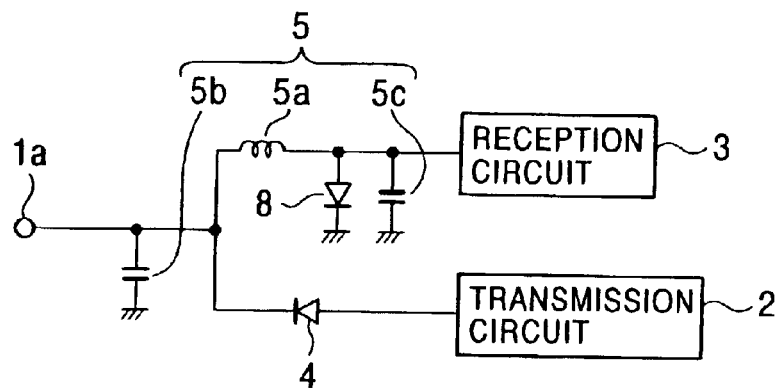
FIG. 3 is a circuit diagram showing the configuration of the antenna switching circuit according to embodiment.

By the mounting structure described above, the transmission circuit 2 and the reception circuit 3 shown in FIG. 3 are formed, and a low-pass filter 5 is formed by the inductor 5a, the second capacitor 5b, and the first capacitor 5c. Furthermore, the cathode of the first switching diode 4 is connected to the anode of the second switching diode 8 via the inductor 5a and the bonding wire 9, so that the switching diodes 4 and 8 can be readily turned on or off together.

According to the construction described above, the first and second switching diodes 4 and 8 are turned on in a transmission mode, whereby the ends of the first capacitor 5c are short-circuited with each other by the second switching diode 8 and the input terminal of the reception circuit 3 is shunted to the ground. Accordingly, the inductor 5a and the second capacitor 5b form a parallel resonance circuit having a resonance frequency substantially equal to the frequency of a transmission signal output from the transmission circuit 2. The transmission signal is output to the first conductor pattern 1a via the first switching diode 4. At this time, the input terminal of the reception circuit 3 is shunted to the ground, so that the transmission signal is not input to the reception circuit 3.

On the other hand, the switching diodes 4 and 8 are turned off in a reception mode, whereby a reception signal input to the first conductor pattern 1a is input to the reception circuit 3 via the low-pass filter 5. Since the first switching diode 4 is turned off, the reception signal is not input to the transmission circuit 2.

Figure 4:
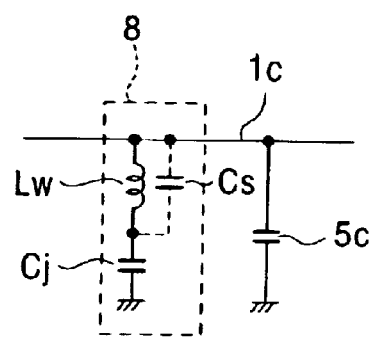
FIG. 4 is an equivalent circuit diagram showing main parts of the antenna switching circuit according to the embodiment.

Furthermore, according to the mounting structure described above, letting an equivalent inductance of the bonding wire 9 be denoted as Lw and an equivalent capacitance of the PN junction of the bare chip 8a when it is off as Cj, an equivalent circuit shown in FIG. 4 is formed between the third conductor pattern 1c and the fourth conductor pattern 1d, in which stray capacitance Cs between the anode of the bare chip 8a and the third conductor pattern 1c is negligibly small due to the conductor layer 7 provided therebetween.

Figure 5:
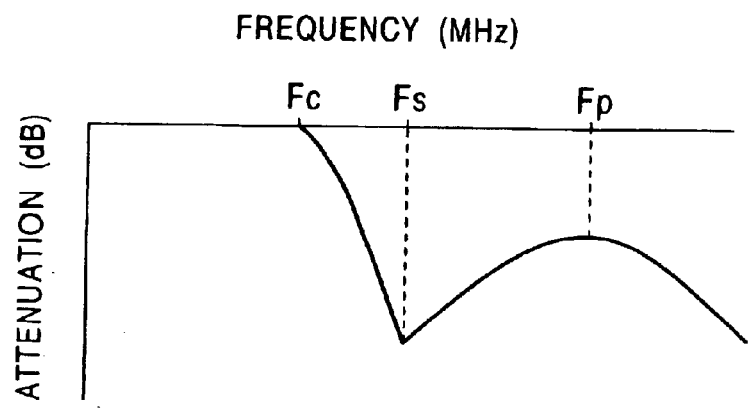
FIG. 5 is a transmission characteristics diagram of the antenna switching circuit according to embodiment.
Figure 6:
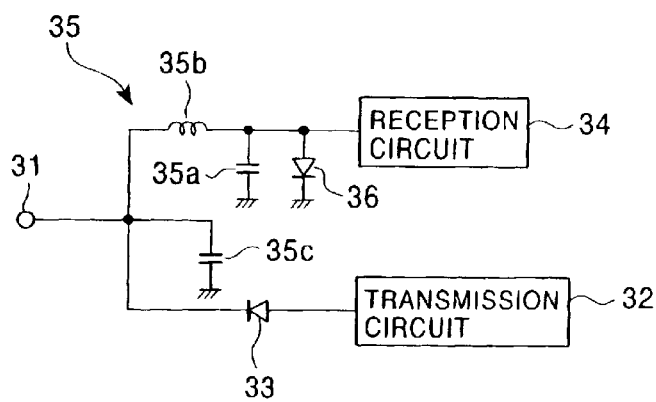
FIG. 6 is a circuit diagram showing the configuration of a known antenna switching circuit.
Figure 7:
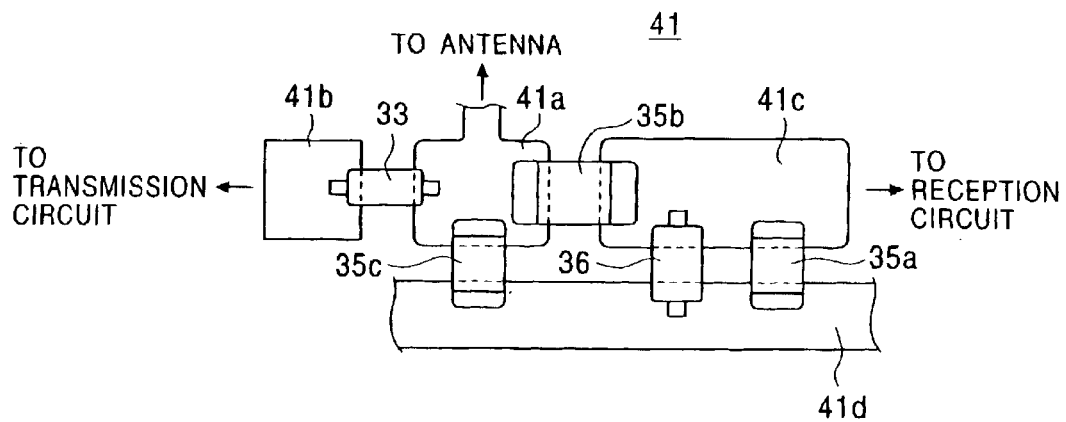
FIG. 7 is a plan view showing a mounting structure of the known antenna switching circuit.
Figure 8:
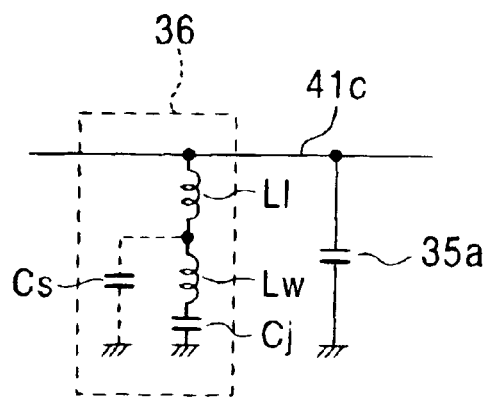
FIG. 8 is an equivalent circuit diagram of main parts of the known antenna switching circuit.
Figure 9:
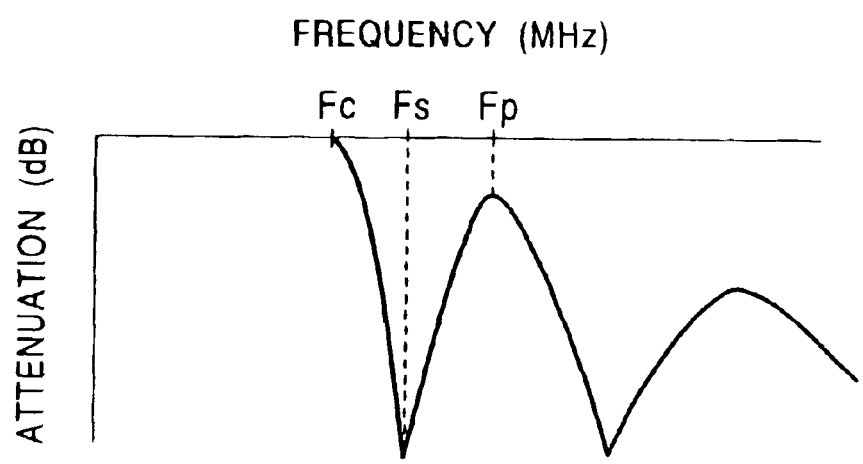
FIG. 9 is a transmission characteristics diagram of the known antenna switching circuit.

Accordingly, a series resonance frequency and a parallel resonance frequency determined by the equivalent inductance Lw of the bonding wire 9, the equivalent capacitance of the PN junction of the bare chip 8a when it is off, and the stray capacitance Cs are extremely high. Furthermore, equivalent inductance in relation to a connection terminal is absent for the second switching diode 8, so that a series resonance frequency and a parallel resonance frequency are much higher compared with known art when the first capacitor 5c is also taken into consideration. Thus, the series resonance frequency Fs is approximately 3,000 MHz, and the parallel resonance frequency Fp is approximately 4,500 MHz, as shown in FIG. 5. The signal levels of unwanted signals in the vicinity of the parallel resonance frequency Fp is much lower compared to known art because the parallel resonance frequency Fp is higher, so that reception interference by the unwanted signals in the vicinity of the parallel resonance frequency Fp is avoided.

What is claimed is:

1. A mounting structure of an antenna switching circuit, wherein an insulating substrate having thereon a transmission circuit, a reception circuit, and an antenna switching circuit is provided; a first conductor pattern connected to an antenna, a second conductor pattern connected to an output terminal of the transmission circuit, a third conductor pattern connected to an input terminal of the reception circuit, and a fourth conductor pattern disposed in proximity to the third conductor pattern and grounded are formed on the insulating substrate; the antenna switching circuit comprises a first switching diode connected between the first conductor pattern and the second conductor pattern, a low-pass filter at least including an inductor connected between the first conductor pattern and the third conductor pattern and a capacitor connected between the third conductor pattern and the fourth conductor pattern, and a second switching diode connected between the third conductor pattern and the fourth conductor pattern, which is turned on or off together in association with the first switching diode; wherein the second switching diode is implemented by a bare chip, and the bare chip is mounted on the fourth conductor pattern with a bottom electrode thereof connected to the fourth conductor pattern and a top electrode thereof connected to the third conductor pattern via a bonding wire.

2. A mounting structure of an antenna switching circuit according to claim 1, wherein the capacitor is formed by the third conductor pattern, a dielectric layer formed as a film on the third conductor pattern, and a conductor layer formed as a film on the dielectric layer, the conductor layer is connected to the fourth conductor pattern, and the bonding wire is disposed above the conductor layer.

3. A mounting structure of an antenna switching circuit according to claim 2, wherein the dielectric layer and the conductor layer are formed by one of thick-film printing means and thin-film vapor deposition means.

* * * * *